Patented June 24, 1930

1,765,899

UNITED STATES PATENT OFFICE

THEODORE P. AVLON, OF SCHENECTADY, NEW YORK

NONALCOHOLIC BEVERAGE

No Drawing.   Application filed March 24, 1925.   Serial No. 18,063.

The present invention relates to the production of non-intoxicating beverages, such as commonly termed "soft drinks." It is the object of my invention to provide a drink of this class which will have a pleasing taste and which will be stimulating without having any harmful psysiological effects.

In accordance with my invention I utilize as a base for the production of my new beverage an acidulated extract of the fruit known as St. John's-bread. This fruit consists of xylocarpous bean-like pods containing seeds which form the fruit of a tree growing in countries surrounding the Mediterranean Sea, and especially in Asia Minor, being known sometimes as carob tree, and being also known botanically as *Ceratonia siliqua*.

It has been suggested to use this fruit as a minor constituent in a coffee substitute, and also as a demulcent or mellowing agent in the production of spiritous liquors, but in neither of these cases is the flavor and body of the St. John's-bread fruit used to produce a distinctively new beverage.

In a beverage of the "soft drink" class, ordinarily charged with carbon dioxide, adapted to be used as a thirst quencher, the main requirement is a pleasing flavor, and in order to give the beverage thirst-quenching properties it is desirable that the beverage should contain an acid pleasant to the taste. Hence the flavor of the body of the beverage should readily blend with the acid to give the beverage a pleasing taste. Although coffee is one of the most popular beverages, it is not pleasing to the palate when acidulated. Hence, the pleasing quality of an extract of St. John's-bread when blended with an acid is unexpected.

Furthermore, in accordance with my invention, the St. John's bread extract is used as the main constituent or body of the beverage, that is, not as a minor constituent, as in the mellowing of whiskey or the like, and auxiliary flavoring matter, such as nut-meg, ginger, and extract of dandelion root preferably are used to produce a desired bouquet.

In accordance with another feature of my invention an infusion of the St. John's-bread is produced in cold water instead of by boiling. In making a syrup from which my beverage may be prepared by dilution, I proceed as follows: For example, one pound of St. John's-bread in the dry state is soaked in a gallon of water for about one week. The pods then are pressed to completely extract the juice. The juice now is concentrated by boiling to about a half gallon. Its taste is slightly sour and has also a sweetish taste. It is not advisable to boil the pulp before extraction as an undesirable flavor is obtained, apparently from the skin of the fruit.

A syrup is next prepared, consisting of a solution of cane sugar in water of a density of about 32 Baumé, preferably flavored with nutmeg, ginger and dandelion root. The nutmeg may be boiled and the juice used, or an extract of nutmeg may be used. Similarly, ginger root may be extracted by boiling with water, or the flavor may be obtained by adding ginger extract. Dandelion root may be extracted by using one ounce of dried root to eight ounces of water, boiling to half the volume, filtering, and preferably adding one-half ounce of glycerine to prevent fermentation. These auxiliary flavors may be added to the sugar solution in suitable proportion according to taste to produce a desired bouquet of flavor.

To one gallon of the sugar solution, as above prepared, six ounces of the concentrated St. John's-bread extract are added. This mixture is acidulated, preferably with a fruit acid, such as citric acid. Three ounces of dry citric acid are dissolved in ten ounces of water. Three ounces of this solution is added to the gallon lot of the above mixture. Some additional flavors may be used such as lemon peel and oil of lemon. In some cases some acid may be developed in the St. John's-bread extract itself by suitable fermentation.

The drink or beverage thus prepared may be charged with carbon dioxide and served suitably iced. It is not only pleasant in flavor but is healthful because of its nourishing and stimulating properties. The dandelion root also is healthful ingredient. No deleterious after effects attend the use of the drink.

What I claim as new and desire to secure by Letters Patent of the United States is:—

1. A syrup or base for the preparation of soft drinks comprising an infusion prepared by the cold extraction of unroasted and unfermented St. John's-bread in water.

2. As an ingredient pertaining to the art of compounding non-alcoholic beverages, a base of a syrupy nature comprising an extract essentially free from alcohol and derived from the unroasted fruit of the carob.

3. A non-alcoholic beverage comprising a solution in water of an extract of unfermented and unroasted carob fruit.

4. A non-alcoholic beverage comprising a solution in water of an extract of unfermented and unroasted carob fruit and acid.

5. In the art of compounding non-alcoholic beverages, the step of extracting the bouquet of unroasted, unfermented carob fruit with cold aqueous solvent.

In witness whereof, I have hereunto set my hand this 23d day of March, 1925.

THEODORE P. AVLON.